Nov. 11, 1947.  J. DAUGHERTY  2,430,760
HYDRAULIC TABLE STOP
Filed Dec. 1, 1944  4 Sheets-Sheet 1

Fig. I

INVENTOR.
JESSE DAUGHERTY
BY *Allen & Allen*
ATTORNEYS

INVENTOR.
JESSE DAUGHERTY
BY Allen & Allen
ATTORNEYS

INVENTOR.
JESSE DAUGHERTY
BY Allen & Allen
ATTORNEYS

Patented Nov. 11, 1947

2,430,760

UNITED STATES PATENT OFFICE 2,430,760

HYDRAULIC TABLE STOP

Jesse Daugherty, Cincinnati, Ohio, assignor to The Cincinnati Planer Company, Cincinnati, Ohio, a corporation of Ohio Application December 1, 1944, Serial No. 566,160

6 Claims. (Cl. 90—58)

My invention relates to an hydraulic table stop for stopping the table of a metal planer in combination with an hydraulic jack for replacing the planer table back upon the bull gear.

Most modern metal planers are driven by a bull gear journaled in the bed of the planer and meshing with a rack which is bolted to the bottom of the table. Power is supplied for reciprocating the table in relation to the bed by a reversing motor actuating the bull gear, and the length of the stroke of the table is determined by dogs slidably mounted on the side of the table which cooperate with a limit switch mounted on the side of the bed.

Planers are now built to run at 300 feet or more and if run off the bull gear at these speeds will travel a considerable distance before being stopped by friction of the ways. Machines, walls, columns or buildings located near the end of the planer may be damaged and workmen may be injured or killed if pinned between the end of the table and some object.

It is an object of my invention to provide a table stop in the form of an hydraulic snubber which smoothly decelerates and stops the movement of a planer table in reference to its bed after it has run off the bull gear.

After the planer table has run off the bull gear and been stopped by a table stop of any kind, it must be replaced upon the bull gear so that the teeth of the bull gear will again mesh with the rack on the bottom of the table. Replacing a table on the bull gear is a considerable job even in experienced hands, and if a crane capable of lifting the table is available, it becomes a major operation on large planers or where a crane is not available, and the replacement will consume several hours time.

In view of the above, it is a further object of my invention to provide in combination with the hydraulic table stop described above, a hydraulic jack for replacing the table on the bull gear.

It is a further object of my invention to provide an hydraulic table stop incorporating an hydraulic jack for replacing the table as indicated above, which will automatically place the hydraulic snubbing action of the stop in operative condition as soon as the jacking operation has been completed, without the necessity of turning valves or adjusting mechanism which, if neglected, would eliminate the hydraulic snubbing action of the stop and thus endanger the mechanism as well as the planer in the event the table ran off the bull gear again.

It is a further object of my invention to provide an hydraulic table stop and hydraulic replacing jack as described above, which may be readily manufactured and made and placed upon modern metal planers of the usual type without a great deal of change or adjustment to the planer.

These and other objects of my invention which will be set forth hereinafter or will be apparent to one skilled in the art upon reading these specifications, I accomplish by that certain construction and arrangement of parts of which I shall now describe an exemplary embodiment. Reference is made to the drawings which form a part hereof, and in which.

Figure 1:
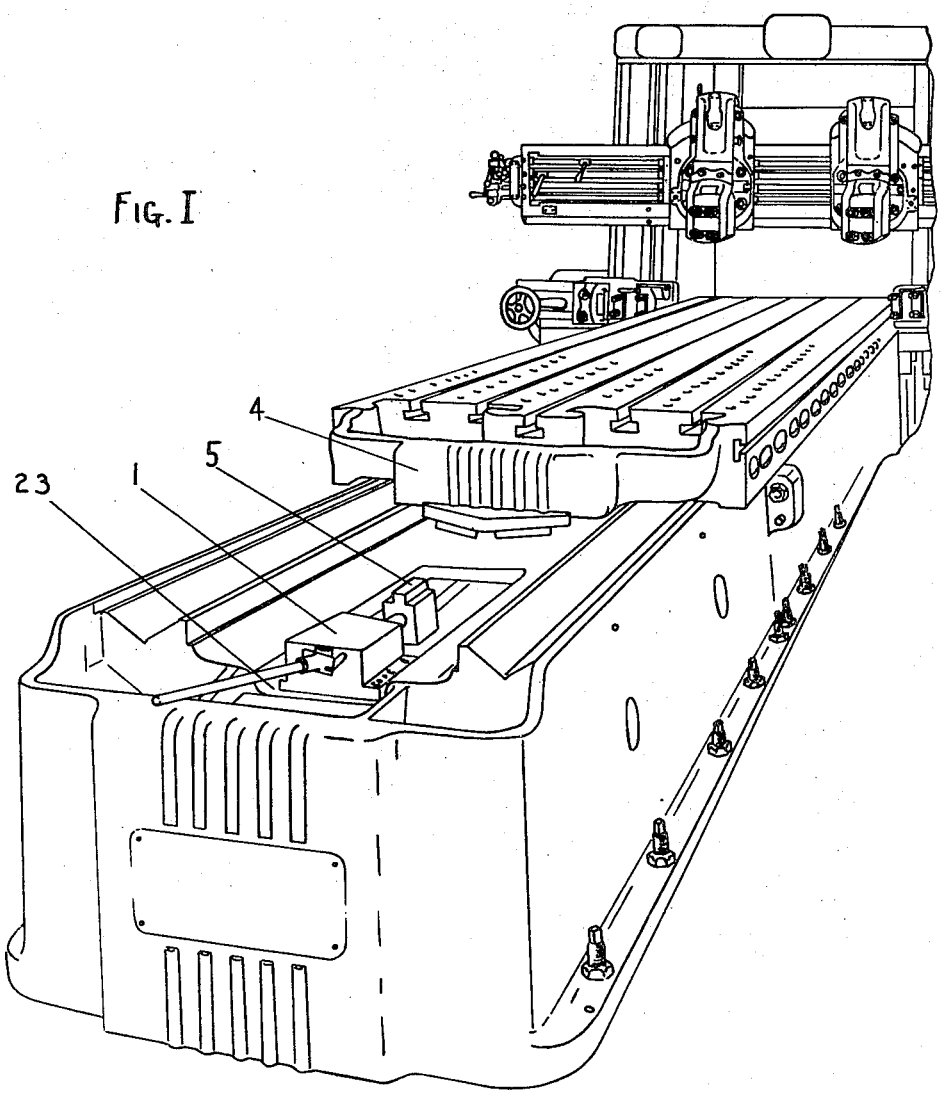
Figure 1 is a perspective view of the top of a modern metal planer bed showing my device in position, and also showing the end of the planer table.

Briefly in the practice of my invention, I provide a table stop consisting of a hydraulic snubber comprising a cylinder fastened to the top of a planer bed and containing a hydraulic piston projecting outwardly from the cylinder and carrying an abutment which is contacted by a block on the under side of the planer table when it has run off of the bull gear. The cylinder is completely filled with oil and an oil escapement or bleeding passage is provided to the outside of the cylinder which permits the bleeding of oil at a slow rate when the piston is forced home in the cylinder. From the above it is apparent that when the table runs off the bull gear and the block contacts the piston abutment, and forces it home, the slow leakage of oil from the cylinder will act as a snubber and slow down and stop the movement of the table without any damaging shock.

In order to make the hydraulic table stop act as an hydraulic jack, it is necessary to first of all close up the oil escapement or bleeding aperture so the cylinder will be completely oil-tight before the operation of the jack piston. I accomplish this by making a portion of the passageway of the oil escapement or bleeding duct through an aperture in the side of the hydraulic jack piston, and I provide means which maintain the hydraulic jack piston in a predetermined position with the oil escapement duct open when the hydraulic jack is not being operated. When the hydraulic jack is operated, its piston is moved and the aperture portion thereon moves away from its position in the oil escapement duct and a solid portion of the jack piston seals the escapement duct during actuation of the hydraulic jack piston.

From the above it is apparent that during the operation of the hydraulic jack in pumping the hydraulic stop piston back into position, and hence forcing the table back upon the bull gear, the hydraulic jack piston is always depressed and the oil escapement duct closed. Immediately upon ceasing operation of the hydraulic jack, spring means forces the jack piston back to its former position, which opens up the oil escapement or bleeding passage.

Referring to the drawings, I provide a casing 1, enclosing a cylinder 2 permanently and rigidly attached to the top of the planer bed 23, and preferably below the lower plane of the table 4. Within the cylinder 2 I provide a piston 3, which projects outwardly from the cylinder 2, and is terminated by an abutment 5.

Figure 2:
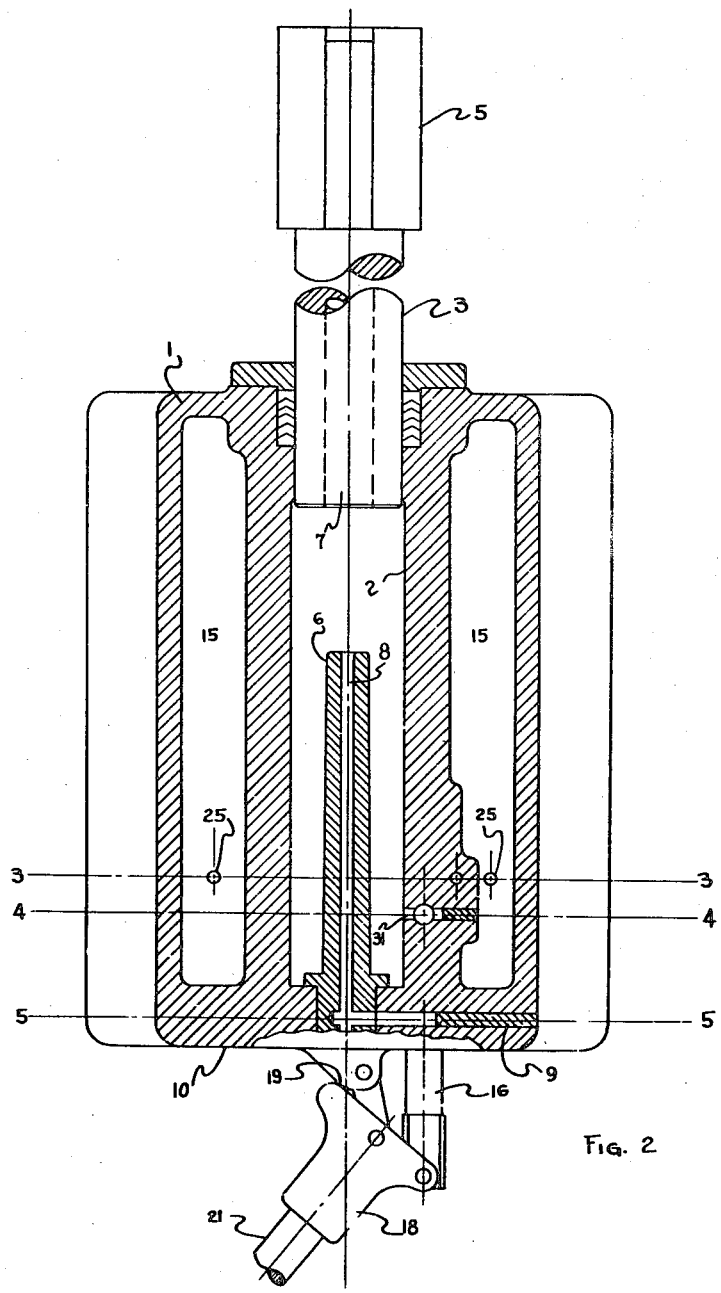
Figure 2 is a plan view partly in section of my novel hydraulic table stop and replacing jack.

Positioned within the cylinder 2 and concentric therewith, I provide a plunger 6, and concentric with the piston 3, I provide an aperture 7 running from the home end of the piston 3 and of such a size that when the piston 3 is forced home in the cylinder 2, the aperture 7 will accommodate the plunger 6, as is apparent in Figure 2.

The plunger 6 has an oil escapement aperture or duct 8 running through its center, and which terminates in a passageway 9 in the cylinder head 10. The passageway 9 communicates with a vertical passageway 11, in the cylinder head 10, which in turn communicates with the hydraulic jack cylinder way 12. In the same vertical plane as the duct or passageway 11, but running in a horizontal direction from the jack cylinder way 12, is a duct 13 and 13'. These ducts 13 and 13' communicate with horizontal ducts 14 and 14' which communicate with an oil reservoir or chamber 15, which is outside of the cylinder 2.

Figure 6:
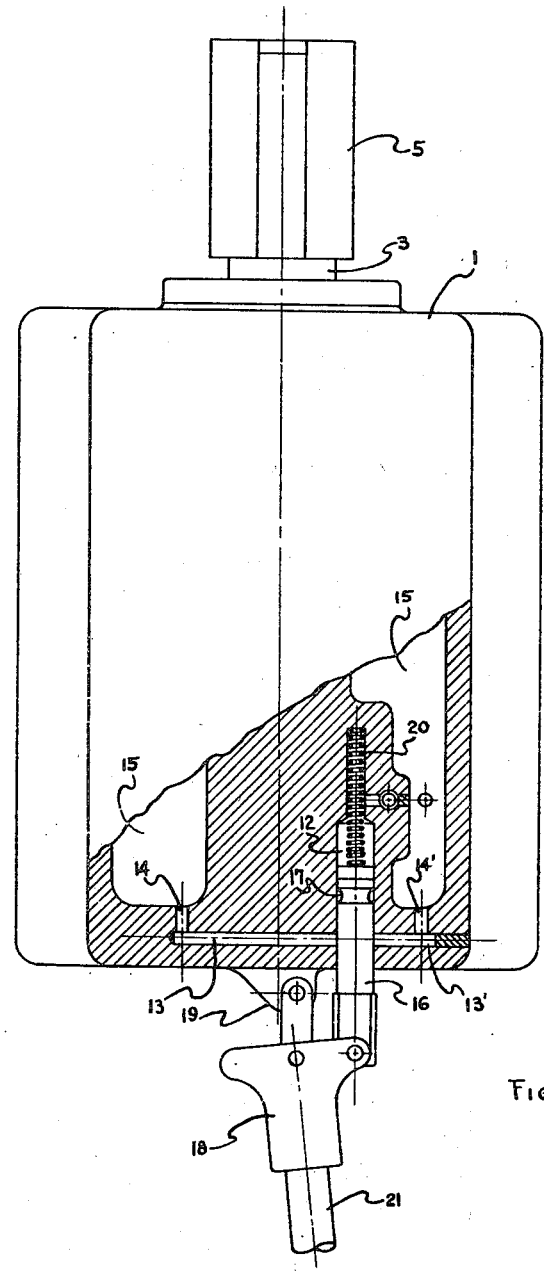
Figure 6 is a plan view partly in section of a portion similar to Figure 2 with the hydraulic jack in operative position.

The hydraulic jack cylinder way 12 has an appreciable depth as shown in Figure 6, and is preferably drilled parallel to the cylinder 2. I provide an hydraulic jack piston 16, journaled for reciprocable movement in the cylinder way 12. On the bearing surface of the jack piston 16, near its pumping surface I provide an indentation or groove 17. I provide a usual type of actuating handle fixture for the jack piston 16, which limits the outward movement of the piston 16, by the abutments 19. I also provide a spring 20, in the cylinder way 12 and under the piston 16 as is illustrated in Figure 6.

The arrangement of the above parts is such that when the jack piston actuating handle 21 is removed or is idle, the spring 20 in the piston way 12, will force the jack piston 16 outwardly until limited by the abutments 19. In this position the aperture or groove 17 will be in line and register with the passageways 13 and 13', and permit oil to flow from the passageway 11, through the passageways 13 and 13', out through the passageways 14 and 14', and into the reservoir or chamber 15. It should be noted that the passageways 14 and 14' which open into the chamber 15, are on a plane spaced horizontally above the interior of the cylinder 2 so that when no pressure is being exerted on the piston 3, oil will not flow out.

From the above description, it is apparent that the hydraulic table stop acts in stopping a table after it leaves the bull gear as follows:

When the table leaves the bull gear a block on the under side of the planer table (not shown) contacts the abutment 5 on the projecting end of the piston 3. The cylinder 2 and all the passageways referred to above, are full of oil. As the force of the escaping planer table through the abutment 5 forces the piston 3 home in the cylinder 2, oil escapes or bleeds through the passageway 8 in the plunger 6, thence through the passageway 9 in the cylinder head 10 up through the vertical passageway 11 past the registered aperture 17 in the jack piston 16 through passageways 13 and 13', and out into the oil reservoir 15 through the passageways 14 and 14'. This action snubs and eventually stops the movement of the runaway planer table, and the position of piston 3 which has been driven home by the action of the runaway planer table is shown in Figure 6.

Figure 3:
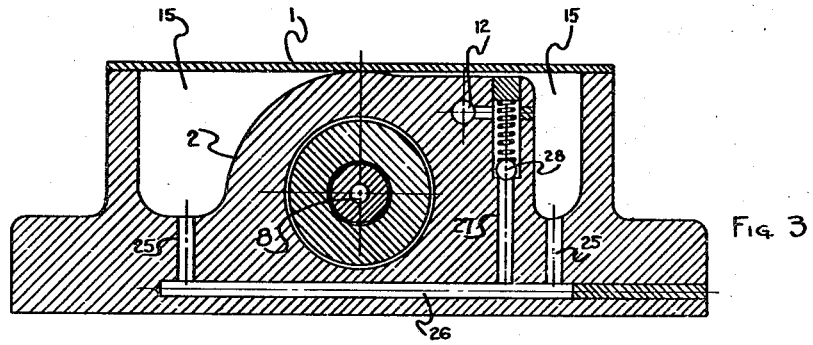
Figure 3 is a cross section taken on the section line 3—3 of Figure 2.
Figure 4:
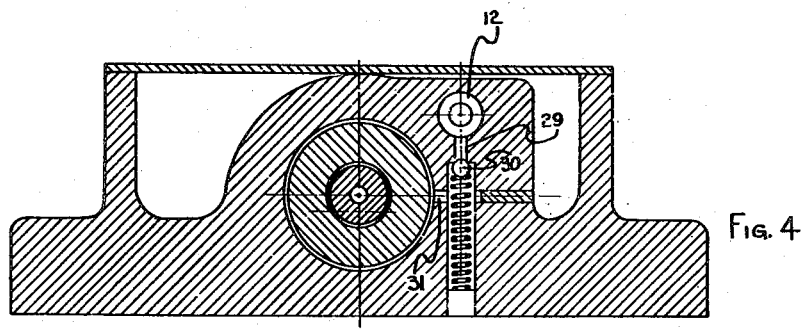
Figure 4 is a cross section taken on the section line 4—4 of Figure 2.
Figure 5:
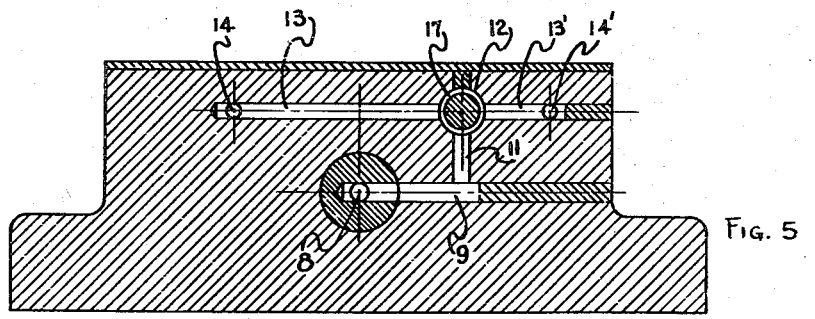
Figure 5 is a cross section taken on the section line 5—5 of Figure 2.

In order to return the planer table back on to the bull gear and also to place the piston 3 of the hydraulic stop in its actuatable position, I have provided certain additional passageways and valves in the cylinder head 10 and cylinder 2 of the hydraulic stop which are as follows:

Communicating with the oil reservoir or chamber 15, I provide two passageways 25 which communicate with a horizontal passageway 26, running through the base supporting the cylinder 2. Passageway 26 communicates with a vertical passageway 27, which is closed by a ball valve 28 (see Fig. 3). This ball valve allows the flow of oil from the reservoir or chamber 15 upwardly through it and prevents the reverse flow thereof. From the valve 28 a passageway communicates through a cross passageway with the cylinder 12 of the hydraulic jack so that when the piston 16 of the hydraulic jack is pulled away or outwardly from the cylinder 12, oil will be sucked from the reservoir 15 through the passageways described above, and the one way valve 28 and into the cylinder 12 of the hydraulic jack piston 16. Downwardly depending from another spot in the jack cylinder 12 is the passageway 29 (see Fig. 4). This passageway crosses a ball valve 30 which permits the flow of oil from the cylinder 12 through the passageway 29 and past the valve but prevents the return flow thereof. After passageway 29 has passed the valve 30 it connects with a horizontal passageway 31 which opens into the cylinder 2.

Using the above description, I will now show the actuation of the jack in returning the piston 3 to its stopping position, and which by this action also returns the planer table to the bull gear. After the runaway planer table has been stopped and has forced piston 3 home in cylinder 2, as is the position shown in Figure 6, it is now necessary to return piston 3 to its former operable position. First of all the jack handle 21 is placed in its bracket 18 and pulled forward so as to depress jack piston 16. In this connection the apertures 17 on the side of the piston 16 are forced out of registry with the apertures 13 and 13' and the smooth sides of piston 16 seal off apertures 11, 13 and 13', and thus seal the cylinder 2 completely. (See Fig. 6.)

The hydraulic jack piston 16 is now operated by the handle 21 against the pressure of the spring 20. As the jack piston 16 is depressed, oil in the cylinder 12 is forced through the passageway 29, past the one way valve 30, through the aperture 31, and into the cylinder 2. Oil is prevented in this action from being forced through apertures 27, 26 and 25 into the oil reservoir 15 by the action of the one way valve 28. When the jack piston 16 is withdrawn, oil is sucked from the reservoir 15 through the passageways 25, 26 and 27, past the one way valve 28 and into the jack cylinder 12. During this operation the one way valve 30 prevents oil from leaving the cylinder 2.

It is apparent from the above operations that the reciprocation of the jack piston 16 in its cylinder 12 draws oil from the reservoir 15 and forces it into the cylinder 2, which in turn forces the piston 3 with its abutment 5 contacting the planer table 4 to the right in the drawings, and pushes the table 4 back on the bull gear and at the same time places piston 3 in its operative hydraulic stop position.

The relative diameters of cylinder 12 and cylinder 2 is such that a great amount of force is applied to the piston 3 with relatively easy actuation of the hydraulic jack pump handle 21.

When the piston 3 has been returned to its set or actuable position and the planer table returned to the bull gear, the handle 21 of the hydraulic jack is withdrawn and then the spring 20 in the cylinder 12 forces the jack piston 16 back to its former position in Figure 2, limited by the abutment 19 of the jack handle bracket 18. In this position the apertures 17 on the sides of the jack piston 16, are in registry with the passageways 13, 13', and 11, and the oil escapement or bleeding aperture from the interior of the piston 2 to the pan 15 is open and in operative position as originally and as shown in Figure 2. Thus the hydraulic table stop is now in position to snub and stop the table if it leaves the bull gear again.

From the above it is apparent that I have provided a hydraulic table stop which may be easily applied to any of the modern metal planers, and which snubs and stops any runaway planer table which has left the bull gear. It is also apparent that I have provided in combination therewith a hydraulic jack which, by its manipulation returns the planer table to the bull gear and sets the hydraulic table stop in its former operative position, while at the same time insuring by a completely automatic operation that the bleeding or oil escapement apertures are opened and in operative position at the end of the jacking operation.

I do not intend to be limited to any particular configuration of passageways or parts, nor to the relative positioning of the different pistons, since it is apparent that these as well as the valves, may be of different construction or different arrangement.

It is to be understood that modification may be made in my invention without departing from the spirit thereof, and I do not intend to limit myself otherwise than as pointed out in the claims which follow.

Having thus described my invention, what I claim as new and desire to secure by Letters Patent is:

1. An hydraulic table stop for a metal planer or the like comprising a piston positioned in a cylinder and carrying a table abutment, the cylinder being filled with a fluid and provided with a bleeding aperture so that when the table actuates the abutment to drive the piston home in the cylinder there results a decelerating action, and a second hydraulic piston and cylinder connected to the first cylinder for moving the first piston back into its original position, said second hydraulic piston having means thereon to close the bleeding aperture of the first cylinder while said second piston is being actuated, and to open automatically said bleeding aperture at the conclusion of said actuation.

2. An hydraulic table stop for a metal planer or the like which comprises a main piston engaged in a horizontally disposed main cylinder adapted to be mounted on the base of a planer with the end of the piston projecting therefrom, a table abutment on the projecting end of the piston, a second hydraulic cylinder associated with said main cylinder and forming a jack, a bleeding passage for said main cylinder running through said second cylinder, a reciprocable piston in said second cylinder, a groove in the side of said reciprocable piston and registerable with said bleeding passage when said reciprocable piston is at one end of its stroke but out of registry with and blocking said bleeding passage when said reciprocable piston is in any other position, spring means for resiliently maintaining said reciprocable piston in groove-and-passage registering position, a duct connecting said second cylinder and said main cylinder so that upon actuation of said second piston the main piston will be moved under power, the whole system being filled with a fluid.

3. An hydraulic table stop for a metal planer or the like comprising a main piston engaged in a main cylinder with a portion projecting, a table abutment on said projecting portion of said main piston, a bleeding aperture in said main cylinder, a second cylinder and piston connected to said main cylinder and means associated therewith for preventing the flow of fluid through the bleeding aperture only when said second piston is being operated.

4. An hydraulic table stop incorporating an hydraulic jack for returning said table stop to operative position, a valved connection between said jack pump and said stop whereby said jack pump upon actuation may exert pressure on said stop, a bleeder for said stop, and a connection between said jack pump and said bleeder to close off said bleeder only when said jack pump is operated, and automatically acting means to open said bleeder when said jack pump is not being actuated.

5. An hydraulic table stop for a metal planer or the like which includes a table abutment associated with a piston riding in an hydraulic cylinder, decelerating means for said piston including a bleeding aperture in said cylinder, an hydraulic pump for returning said piston to its operative position, and means associated with said pump for closing said bleeding aperture only when said hydraulic pump is being operated.

6. In a structure of the class described, a base shaped to provide a sump for fluid and a casing, a main cylinder in said casing, a piston in said main cylinder, said piston bearing an abutment, a supplementary cylinder in said casing, a valved connection between said supplementary cylinder and said sump, a valved connection between said supplementary cylinder and said main cylinder, a piston in said supplementary cylinder, means for actuating said piston to produce a pumping action whereby fluid may be introduced into said main cylinder, and a closable bleeder passage connecting said main cylinder with said sump, a portion of said bleeder passage running across said supplementary cylinder and piston and adapted to be opened and closed by means on said supplementary piston controlled by the position thereof, and resilient means urging the supplementary piston to a position to open said bleeder passage, said bleeder passage being connected to said sump at a point sufficiently high to prevent the draining of said main cylinder by gravity.

JESSE DAUGHERTY.

REFERENCES CITED

The following references are of record in the file of this patent:

UNITED STATES PATENTS

| Number | Name | Date |
|---|---|---|
| 240,044 | Shaw | Apr. 12, 1881 |
| 533,894 | Hill | Feb. 12, 1895 |
| 1,904,115 | Bacon | Apr. 18, 1933 |
| 2,018,506 | Walker | Oct. 22, 1935 |
| 788,931 | McCain | May 2, 1905 |
| 1,089,068 | Miehle | Mar. 3, 1914 |
| 1,661,016 | Smith | Feb. 28, 1928 |
| 579,785 | Barton | Mar. 30, 1897 |
| 1,865,561 | Furgason | July 5, 1932 |
| 2,115,230 | Oliver | Apr. 26, 1938 |
| 2,107,970 | Wells | Feb. 8, 1938 |